(12) United States Patent
Hayden et al.

(10) Patent No.: US 8,468,040 B1
(45) Date of Patent: Jun. 18, 2013

(54) SYSTEM AND METHOD FOR IDENTIFYING AND UPGRADING A TRANSMISSION GRID

(76) Inventors: Joseph Jolly Hayden, Bellaire, TX (US); Terrance Lee Dodson, Houston, TX (US); Phillip Edward Andrus, Jr., League City, TX (US); Marc D. Winthrop, New York, NY (US)

( * ) Notice: Subject to any disclaimer, the term of this patent is extended or adjusted under 35 U.S.C. 154(b) by 2105 days.

(21) Appl. No.: 10/845,717

(22) Filed: May 14, 2004

(51) Int. Cl.
*G06Q 10/00* (2012.01)
(52) U.S. Cl.
USPC .......................................... 705/7.11; 700/286
(58) Field of Classification Search
USPC .......................................... 705/7.11; 700/286
See application file for complete search history.

(56) References Cited

U.S. PATENT DOCUMENTS

| | | | |
|---|---|---|---|
| 6,949,843 B2 * | 9/2005 | Dubovsky | 307/64 |
| 2002/0019758 A1 * | 2/2002 | Scarpelli | 705/7 |
| 2003/0011348 A1 * | 1/2003 | Lof et al. | 322/37 |
| 2003/0110146 A1 * | 6/2003 | Machitani et al. | 705/412 |
| 2004/0044442 A1 * | 3/2004 | Bayoumi et al. | 700/286 |
| 2009/0281673 A1 * | 11/2009 | Taft | 700/286 |
| 2010/0152910 A1 * | 6/2010 | Taft | 700/286 |

OTHER PUBLICATIONS

Southwest Power Pool Press Release, Southwest Power Pool Transmission Owners Propose Creative Solution for LaCygne-Stilwell Capacity Issue, Feb. 20, 2003, 2 pages.
Stagliano, et al., The Electric Transmission Paradox, Mar. 2004, pp. 37-46.

* cited by examiner

*Primary Examiner* — Johnna Loftis
(74) *Attorney, Agent, or Firm* — McCarter & English, LLP

(57) ABSTRACT

A system and method for upgrading or otherwise improving performance and/or operation of a transmission grid are provided. The system and method involve identifying transmission grid constraint(s), e.g., transmission bottlenecks or other causes of system congestion, and implementing step(s) to alleviate such constraint(s) on terms and conditions that shift initial capital requirements away from grid owners/operators. The capital-shifting mechanisms generally include installation of and/or access to equipment for monitoring and/or measuring grid performance parameter(s) on a predetermined basis, e.g., in real-time, on a daily basis or the like. A processor is provided that is programmed to calculate a payment stream to be paid to the independent party responsible for effectuating the grid performance upgrade based on measurement of performance parameters.

17 Claims, 3 Drawing Sheets

SYSTEM AND METHOD FOR IDENTIFYING AND UPGRADING A TRANSMISSION GRID

BACKGROUND

1. Technical Field

The present disclosure is directed to a system and method for identifying and upgrading or otherwise improving the performance of selected transmission grid elements and/or operation of a transmission grid and, more particularly, to a system and method for identifying transmission grid constraint(s) with physical and/or economic characteristics that satisfy predetermined criteria and implementing step(s) to alleviate such constraint(s) on terms and conditions that shift restrictive, major capital requirements, construction and development risk away from grid owners/operators.

2. Background Art

The United States electrical system has historically been run by integrated, regulated utilities. These utilities were charged with building and operating all three of the major components of the US electrical system:

Generation—Building and operating power plants (mostly coal, natural gas, oil, nuclear and hydro);

Transmission—Building and operating the high voltage long distance wires, transformers, substations and other components that transport and support the electricity from its point of generation to its point of distribution; and Distribution—Building and operating the substations, systems and low voltage lines that distribute the electricity within a specific area (such as an industrial park or residential neighborhood).

The physical infrastructure of the North American transmission system is limited in all geographic regions. Over the last 10 to 20 years, the system evolved to meet the service territory needs of electric utilities, but not to accommodate large scale wholesale power trading or generation outside of an integrated utility's own local region. Transmission between service territories has generally been built to accommodate shares of generating plants in one area owned by utilities elsewhere and to provide modest levels of generation reserve sharing between utilities and regions. Today, the transmission system can be characterized as a set of networks covering the service territories of the dominant utilities, separated by relatively weak and often stressed regional system interconnections. An exception to the foregoing description is in the West, where the Pacific AC and DC inter-ties were built to export the massive amounts of non-firm hydro-energy available in most years in the Pacific Northwest to California and to enable seasonal diversity exchanges between north and south.

In the United States, the Federal Energy Regulatory Commission (FERC) and the various state Public Service Commissions regulate the utility companies. These governing bodies approve all of the utilities' new construction and upgrades, and dictate the amount that the utilities charge (tariffs) based upon the value of their assets. This arrangement guarantees each utility a constant rate of return on its investments and, up until deregulation, all utilities were guaranteed monopolies in their respective territories.

In 1996, FERC issued Order 888 and Order 889, which deregulated the U.S. electrical markets in hopes of eliminating the utility monopolies by opening the door for innovative approaches to minimize costs of electricity to consumers. One significant result of deregulation was the appearance of merchant generators, or independent power producers, who compete against the existing generating assets of the integrated utilities. This burst of growth in merchant energy producers, along with the growth in electrical energy trading, captured a significant portion of the cash flow of the industry available to invest. However, the FERC orders gave limited direction as to how to provide the required amount of investment in the electrical transmission grid, which was needed to complete FERC's vision of lower electrical cost to all consumers in the United States.

Today, the largest problem facing the merchant power market is the lack of available electrical transmission capacity. The transmission system was built to serve the various electrical loads with the driving factor for determining improvements being reliability as opposed to economic benefit. Without market factors driving improvements in electrical transmission, the US electrical system has suffered from decades of severe under investment while demand has continued to grow.

As evidenced by the blackout that covered much of the Northeastern United States in August, 2003, the transmission grid in the United States is in need of a long overdue upgrade. Although the industry has known this for years, the blackout gave the need to remedy the situation a much higher sense of urgency. One of the major reasons that the grid has not kept up with the growth in the economy of the United States is that there are few economic drivers to motivate owners to perform such upgrades.

The deregulation of the energy markets in the early 1990s caused a sea of change in the way energy is produced, transported and sold in the US. The financial rewards were perceived to be in generating and trading the energy in newly developed competitive markets. FERC has seldom granted a return on equity (ROE) for transmission investment greater than ten percent (10%), except to add some minor incentives, e.g., for transmission owners who join regional transmission organizations or divest transmission assets from vertically integrated monopoly functions. The transportation of power has been left up to the "old" system of vertical utilities, which were now operating in a new paradigm. Over 125,000 MW of new generation capacity has been added to the grid since 1996 by independent power producers who, by the requirements imposed by the Energy Policy Act of 1992, financed all of the enhancements to the transmission system that were necessary not only to interconnect to the grid, but to be integrated in the bulk power system.

At the core of the paradox that has come to exist in the regulatory environment, FERC (which has jurisdiction over the interstate sales of power) is powerless to order the construction of interstate transmission capacity. With the financial constraints associated with current energy system participants, funding has become more expensive, returns more elusive, and maintenance and improvement of the grid has fallen on the back burner. The result is that the movement (or "wheeling") of electricity around the country is done on an inefficient and non-economic basis. In addition, problems are not being solved because the owners of the transmission systems operate under regulations that do not encourage spending money to upgrade the transmission system outside of maintaining perceived reliability needs (which, most often, are not developed to provide economic benefit to the end user).

Thus, a need exists for a system and/or method that addresses the substantial needs of the transmission grid. In addition, a need exists for capital funding mechanisms that will facilitate transmission grid needs to be addressed in a timely and effective manner. These and other needs are satisfied by the system(s) and method(s) disclosed herein.

SUMMARY OF THE DISCLOSURE

According to the present disclosure, an advantageous system and method for identifying and upgrading or otherwise improving the performance of selected transmission grid elements and/or operation of a transmission grid are provided. The disclosed system and method involve identifying transmission grid constraint(s), e.g., transmission bottlenecks or other causes of system congestion with physical and/or economic characteristics that satisfy predetermined criteria, and implementing step(s) to alleviate such constraint(s) on terms and conditions that shift restrictive, major capital requirements, construction/development risks, and/or other contingencies/exposures away from grid owners/operators. According to exemplary capital-shifting, risk-shifting and exposure-shifting mechanisms, systems and methods of the present disclosure generally include installation of and/or access to equipment for monitoring and/or measuring grid performance parameter(s) on a predetermined basis, e.g., in real-time, on a daily basis or the like. Exemplary systems and methods of the present disclosure generally include a processor that is programmed to calculate a payment stream to be paid to the party responsible for effectuating the grid performance upgrade/enhancement based on the foregoing measurement of performance parameters.

A plurality of exemplary financial structures have been developed for use according to the disclosed system and method which facilitate the use of private funding to address shortcomings in the utility grid, while providing attractive returns to investors in such upgrades/enhancements and creating low cost asset(s) for the utilities. By providing higher risk, private capital and capturing the congestion cost savings for the benefit of their investors, the disclosed system and method helps to alleviate current transmission grid problems by identifying and addressing one or more finite points on the grid that stand to benefit from upgrade and/or enhancement.

Of note, the systems and methods of the present disclosure have particular application for addressing constrained electric transmission system flowgates, many of which currently exist on the domestic transmission grid. Flowgates are "bottlenecks" that routinely prevent or inhibit the requested, or needed, flow of electrical power. Constrained flowgates are generally unique points on a power transmission grid which, if upgraded, would either allow a significant amount of additional electricity to be transmitted, or the same amount of electricity to be transmitted at a substantially and/or significantly lower cost to the end user. In addition to the potential physical need to reroute electrical power, flowgates cause congestion in the transmission grid and translate to a real cost to transmission line owners and/or others involved in the generation and/or delivery of electrical power to end users.

The disclosed systems and methods allow economic and competitive factors to govern investment in new transmission capacity, as compared to the old investment model where development of the transmission grid was driven only by reliability, not economic, needs. The risks of investment inefficiency, construction, development and cost overruns are placed on investors rather than consumers, but returns commensurate with this risk are then offered to the independent individuals/entities involved in financing such investment and incurring the risks/exposures associated therewith. Moreover, many of the planning and regulatory issues associated with potential upgrades/improvements to the grid when undertaken by regulated utilities are unnecessary or streamlined when the financial risks are transferred to or assumed by independent investor(s). Indeed, potential risk to consumers/end users is essentially eliminated, while significant benefits are nonetheless delivered to such consumers/end users.

Additional benefits, advantages and functionalities associated with the disclosed systems and methods will be apparent from the detailed description which follows, particularly when reviewed together with the figures appended hereto.

BRIEF DESCRIPTION OF THE FIGURES

To assist those of ordinary skill in the art in making and using the systems and methods of the present disclosure, reference is made to the appended figures, wherein.

DESCRIPTION OF EXEMPLARY EMBODIMENT(S)

Figure 1:
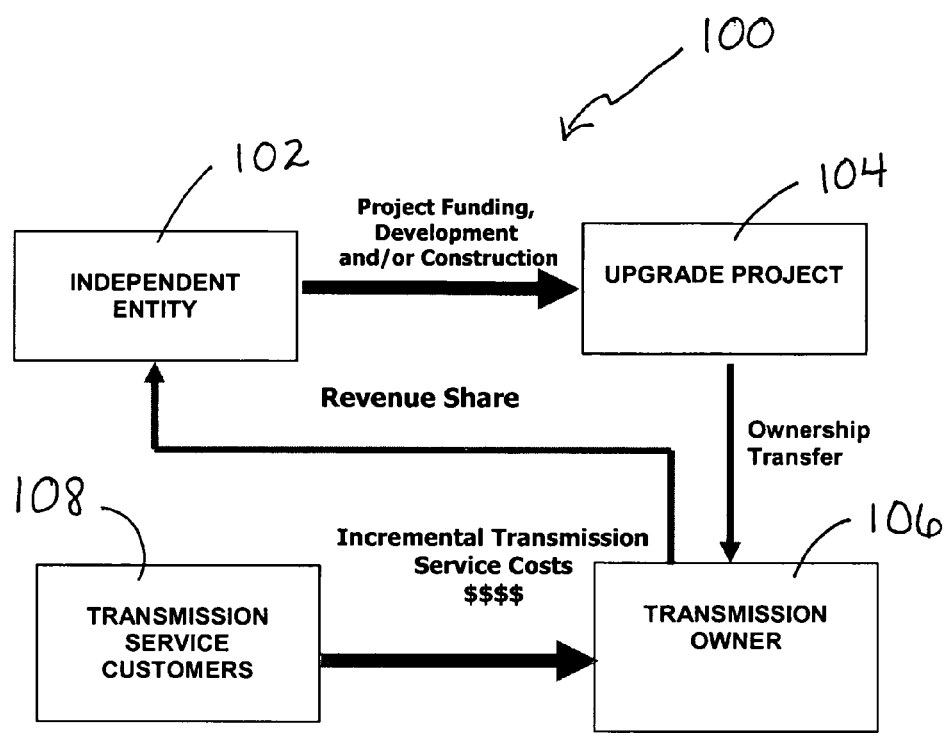
FIG. 1 is a schematic flow chart of an exemplary implementation of the disclosed system/method for effecting utility grid upgrade(s) according to the present disclosure.

An advantageous system and method for upgrading or otherwise improving the performance and/or operation of a transmission grid or system are disclosed herein. As used herein, the following terms shall have the meanings set forth herein.

System: An interconnected combination of generation, transmission, and distribution components comprising an electric utility, an electric utility and independent power producer(s), or group of utilities and independent power producer(s).

System Operator An individual at an electric system control center whose responsibility it is to monitor and control that electric system in real time.

Electric Utility: A corporation, person, agency, authority or other legal entity or instrumentality that owns or operates facilities for the generation, transmission, distribution or sale of electric energy primarily for use by the public and is defined as a utility under the statutes and rules by which it is regulated. Types of electric utilities include investor-owned, cooperatively-owned, and government-owned (federal agency, crown corporation, state, provincials, municipals, and public power districts).

Independent Power Producer: Any entity that owns or operates an electricity generating facility that is not included in an electric utility's base rate. This phrase includes, but is not limited to, co-generators and small power producers and all other non-utility electricity producers, such as exempt wholesale generators who sell electricity.

Interconnection: The facilities that connect two systems or Control Areas. Additionally, an interconnection refers to the facilities that connect a non-utility generator to a Control Area or system.

Transmission: An interconnected group of lines and associated equipment for the movement or transfer of electric energy between points of supply and points at which it is transformed for delivery to customers or is delivered to other electric systems.

Control Area An electric system or systems, bounded by interconnection metering and telemetry, capable of controlling generation to maintain its interchange schedule with other Control Areas and contributing to frequency regulation of the Interconnection.

Availability: A measure of time that a generating unit, transmission line, or other facility is capable of providing service, whether or not it is actually in service. Typically, this measure is expressed as a percent available for the period under consideration.

Capacity: The rated continuous load-carrying ability, expressed in megawatts (MWs) or megavolt-amperes (MVAs) of generation, transmission or other electrical equipment.

Net Capacity: The maximum capacity (or effective rating), modified for ambient limitations, that a generating unit, power plant, or electric system can sustain over a specified period, less the capacity used to supply the demand of station service or auxiliary needs.

Capacity Emergency: A state when a system's or pool's operating capacity plus firm purchases from other systems, to the extent available or limited by transfer capability, is inadequate to meet the total of its demand, firm sales and regulatory requirements.

Curtailability: The right of a transmission service provider to interrupt all or part of a transmission service due to constraints that reduce the capability of the transmission network to provide that transmission service. Transmission service is to be curtailed only in cases where system reliability is threatened or emergency conditions exist.

Metering: The methods of applying devices that measure and register the amount and direction of electrical quantities with respect to time.

Metered Value: A measured electrical quantity that may be observed through telemetering, supervisory control and data acquisition, or other means.

Independent Entity: An entity, individual or party that is independent from those entities, individuals and parties involved in providing generation, transmission and/or distribution services on the utility grid/system, i.e., an entity having no vested interest in electricity generation, transmission and/or distribution.

Additional terms and phrases used to describe exemplary embodiments and/or implementations of the disclosed systems and methods herein shall have their ordinary meaning, unless such term(s) are otherwise expressly used in a manner inconsistent with such ordinary meaning, as will be apparent to and understood by persons of ordinary skill in the art.

Generally, the disclosed system and method involve identifying transmission grid or transmission system constraint (s), e.g., transmission bottlenecks or other causes of system congestion, and implementing step(s) to alleviate such constraint(s). The corrective actions may include adding transformer capacity, upgrading transmission lines, installing new transmission components that aid in supporting system voltage, and/or other system upgrades/enhancements, as will be apparent to persons skilled in the art based on the unique and/or individual constraint(s) identified at finite points on the transmission grid/system. However, the present disclosure is not limited to the foregoing corrective actions; rather, the systems and methods of the present disclosure extend to and encompass any corrective action or set of corrective actions that may be deemed appropriate or desirable based on operation and/or performance parameters associated with the grid.

The disclosed system and method advantageously shifts the funding requirements and associated risks/exposures for the system upgrade/enhancement away from the electric utility and transmission operator. Indeed, according to the present disclosure, an independent individual or entity undertakes the funding requirements and management/implementation responsibilities associated with undertaking the system upgrade/enhancement, and facilitates and/or manages most (if not all) aspects of the implementation thereof, e.g., by engaging appropriate design and build contractors, obtaining appropriate regulatory and/or land use approvals, and the like. Thus, at the time the system upgrade/enhancement is undertaken, the electric utility(ies) and/or transmission operator(s) that stand to benefit from the system upgrade/enhancement undertake essentially no financial risk or exposure, thereby shifting initial capital requirements away from grid owners/operators.

According to exemplary capital-shifting and risk-shifting mechanisms of the present disclosure, appropriate measurement tools, e.g., metering equipment, is typically installed and/or positioned in or on the system to permit monitoring and/or measuring of grid/system performance parameter(s) in connection with the system upgrade/enhancement. In typical implementations of the present disclosure, the measurement tool is adapted to monitor and/or measure system performance on a predetermined basis, e.g., in real-time, or at preset time intervals, e.g., hourly, daily, weekly or the like. Thus, in an exemplary embodiment of the present disclosure, a base or pre-upgrade/pre-enhancement performance level is established prior to undertaking implementation of an upgrade/enhancement, e.g., based on system capacity, net capacity or the like. Thereafter, the disclosed system/method measures/monitors the enhanced performance that is achieved based on implementation of the foregoing system upgrade/enhancement. Returns to the independent entity are generally limited to and based upon the differential between the base performance level (i.e., the performance level prior to the upgrade (s)/enhancement(s)) and the new performance level (i.e., the performance level after implementation of the upgrade(s)/enhancement(s)).

Exemplary systems and methods of the present disclosure generally include a processing unit that is programmed to calculate a payment stream to be paid to the party responsible for effectuating the grid performance upgrade/enhancement based on data input with respect to performance parameters associated with the system upgrade/enhancement. The processing unit is typically a computer system that includes conventional components, e.g., processing element(s), memory element(s) and data input/output element(s). In preferred embodiments of the present disclosure, the processing unit is associated with a network, e.g., a local area network, wide area network, and/or the Internet, and is adapted to communicate with other networked components. Thus, for example, the processing unit for calculating a payment stream according to the disclosed system/method is generally adapted to communicate with the measurement tool(s) associated with the system upgrade/enhancement. Indeed, in an exemplary embodiment of the present disclosure, such processing unit is embodied (in whole or in part) as part of such measuring tool(s).

In an alternative embodiment of the present disclosure, measurement data associated with system performance is manually input to a processing unit, e.g., by a system operator, and such input measurement data is used to calculate a payment stream. Of note, payment stream calculations according to the present disclosure may involve multiple measurement tools that measure/monitor system performance at different system locations, e.g., at interconnections and/or in control areas, at different times, and/or monitor/measure performance parameters of different types. Thus, the disclosed system/method may involve the collection of multiple data points for use by the processing unit to calculate a payment stream, and the processing unit is typically programmed to make desired calculations based on such multiple data point input. Based on the calculations, reports may be generated reflecting the payment stream calculations and/or automatic fund transfers may be effected, as are known in the art.

A plurality of exemplary financial structures have thus been developed for use according to the disclosed system and method which facilitate the use of private funding to address shortcomings in the utility grid, while providing attractive returns to investors in such upgrades and creating low cost asset(s) for the utilities. By providing higher risk, private capital and capturing the congestion cost savings for the benefit of their investors, the disclosed system and method helps to alleviate current transmission grid problems. Moreover, the disclosed system upgrades/enhancements may be advantageously performed through the use of non-regulated private capital for the benefit of the end use customers, power generators, distribution and transmission companies. Thus, the present disclosure provides private investment capital with an opportunity to fund and profit from grid/system-related investments on a non-regulated basis, while providing the regulated transmission operators a means of obtaining critical upgrades/enhancements that may be built/implemented in an environment of capital constraints and heightened spending scrutiny by regulators.

The disclosed systems and methods allow economic and competitive factors to govern investment in new transmission capacity, as compared to the old investment model where development of the transmission grid was driven only by reliability, not economic, needs. The risks of investment inefficiency and cost overruns are placed on investors rather than consumers, but returns commensurate with this risk are then offered to the independent individuals/entities involved in financing such investment. Moreover, many of the planning and regulatory issues associated with potential upgrades/improvements to the grid when undertaken by regulated utilities are unnecessary or streamlined when the financial risks are transferred to or assumed by independent investor(s). Indeed, potential risk to consumers/end users is essentially eliminated, while significant benefits are nonetheless delivered to such consumers/end users.

According to an exemplary embodiment of the present disclosure, the following steps are undertaken:

Establish funding or capitalization for an independent entity, i.e., an entity that is independent from electric utility, electricity generators, and transmission operators;

Use appropriate models or criteria, e.g., calculation models, to identify constraints in a transmission grid/system which are resulting in congestion costs, typically substantial congestion costs, that warrant implementation of an upgrade/enhancement to a finite point (or series of finite points) on the grid/system;

Develop a comprehensive plan to reduce and/or eliminate the constraint(s) to the grid/system through appropriate grid/system upgrade(s) and/or enhancement(s);

Contract with the respective stakeholders (e.g., electric utility, transmission operator, electricity generator) to perform and/or implement the upgrade/enhancement and participate in the resulting incremental revenue or savings;

Perform and/or implement the grid/system upgrade(s) and/or enhancement(s) based upon the foregoing comprehensive plan;

Transfer ownership of the upgraded/enhanced asset to the regulated transmission operator;

Measure grid/system performance to establish data related to the improved performance of the grid/system with respect to the finite point and/or finite points that were the subject of upgrade(s)/enhancement(s) based on such upgrade(s)/enhancement(s);

Provide or communicate the performance-related measurement data to a processing unit for use in calculating or otherwise determining level(s) of enhanced performance associated with or derived from such upgrade(s)/enhancement(s);

Based on the foregoing level(s) of enhanced performance and economic benefits associated therewith, a processing unit calculates the amount(s) payable to the independent entity responsible for performing and/or implementing such upgrade(s)/enhancement(s);

Transfer the calculated payment amount(s) to the independent entity responsible for implementing the upgrade/enhancement to the system/grid.

Although numerous systems for calculating a payment stream based on improved grid/system performance may be implemented according to the present disclosure, three (3) specifically contemplated calculation modalities are described herein. Of note, although the independent entity is typically not a regulated entity, the independent entity will nonetheless have a contractual right to receive a portion of its customer's regulated cash flows according to the systems and methods of the present disclosure. In addition to participating in regulated cash flows, the independent entity will also be able to take advantage of market driven demand in the electricity grid. The independent entity will thus simultaneously reduce and capture the costs of transmission congestion. Contemplated earn-out mechanisms according to the present disclosure include:

An agreed-upon percentage of increased transmission revenues are paid directly to the independent entity as a result of the system upgrade/enhancement, i.e., a physical rights model;

An agreed-upon percentage of congestion cost savings received or realized by electrical load serving entity(ies) are paid to the independent entity, i.e. a nodal model; and An agreed-upon percentage of additional revenue received by merchant generators, integrated utility generators, energy trading companies and/or other identified stakeholders are paid to the independent entity, i.e., a discrete benefit model.

A significant need exists for the types of grid/system upgrades/enhancements that are supported and/or facilitated by the disclosed system and method. Constraints in the transmission grid are often measured in terms of denied service requests, e.g., based on curtailability, and instances of transmission loading relief, i.e., TLRs. During the summer of 2002, it is estimated that flowgate constraints resulted in over 875 TLR conditions causing over 10,000 hours of curtailed transmission operation. TLRs involve a sequence of actions taken by a transmission system operator to avoid or remedy reliability violations associated with the electrical transmission system under its control. Formal TLR procedures are identified by the National Electric Reliability Council (NERC) as a mechanism to ensure certain consistencies and fairness in resolving issues of electrical transmission system security that arise due to financial transactions to avoid loss of electrical service or damage to the system. NERC estimates that in 2002, denial of transmission service requests due to TLRs imposed on constrained flowgates resulted in revenue opportunity loss of over $1 billion, and such losses are expected to increase if action is not taken to improve the nation's electrical transmission system.

As noted above, system/grid upgrades and enhancements that may be undertaken according to the present disclosure may take a variety of forms, including undertaking the addition of electric transformers, upgrading transmission lines, and/or installing new transmission components that aid in supporting system voltage. Of note, the systems and methods of the present disclosure are not limited to the foregoing illustrative types of upgrades/enhancements; rather, the systems and methods of the present disclosure may be advantageously employed with alternative forms of grid/system upgrades and/or enhancements, as will be readily apparent to persons skilled in the art. Generally, the systems and methods of the present disclosure have particular application for addressing constrained electric transmission system flowgates, many of which currently exist on the domestic transmission grid. If upgraded, these unique points on a power transmission grid would either allow a significant amount of additional electricity to be transmitted, or the same amount of electricity to be transmitted at a substantially and/or significantly lower cost to the end user.

Transformer Additions

Transmission constraints caused by lack of transformer capacity are common. This type of improvement project typically involves installation of an equally sized transformer in parallel operation with an existing unit. This addition increases the "flowgate" capacity by allowing continued electrical flow between the high-side and low-side electrical connections during certain events, e.g., when one of the two transformers is removed from service.

The normal project cost for one transformer addition is between $5 million and $10 million. This cost includes equipment cost, foundation installation, connection, metering and relay protection equipment. The timeframe to complete this type of project is usually one year, most of which is the manufacturing time to build the new transformer. Construction time is usually 3 to 6 months. In most cases, the new transformer can be placed inside the existing switchyard boundaries, eliminating the need to acquire new land for the improvement project.

Transmission Line Upgrades

The most common transmission constraint improvement requires the increase of transmission line capacity. This type of project scope can be as simple as replacing discrete transmission line components (such as metering devices, switches and circuit breakers) or as extensive as installing a new transmission line (which includes new support structures, wire and switching station terminations). The project cost can range from as little as $200,000 to well over $100 million. Many transmission line upgrades range between $8 million and $30 million. For projects requiring the installation of larger capacity wire, in certain instances it is possible to develop a project scope that permits re-use of existing support towers. In addition, recent electrical transmission technology improvements have created wire products that allow much more electricity to flow through conductors with higher strength to weight ratios, eliminating the significant cost and time of installing new transmission line structures.

The timeframe to complete a transmission line upgrade is, of course, dependent on project scope. Most multi-mile transmission line upgrade projects that re-use the existing support structures can be completed within one year.

Voltage Support Upgrades

A growing application in electrical transmission improvement is the addition of devices that help support system voltage. These devices are connected to the transmission system in locations in which it is difficult for local-area generation facilities to keep the transmission system voltages to required standards. These devices generally include capacitors, reactors, and diode-switching devices, all used to respond to transmission system voltage requirements almost instantaneously. Most applications for these devices are in electrical load regions where only one or two transmission lines are available for use. Most upgrade projects of this type cost in the $1 million to $10 million range and require a period of less than one year to install.

Stakeholder Contracts

In order to define the terms of responsibility, revenue allocation, liability and term for each transmission upgrade/enhancement project, a contract is typically negotiated by the independent entity, the transmission owner and other applicable stakeholders (e.g., regional transmission organization, merchant generator, energy trading company, etc.). The contract typically includes the performance criteria/delivery time for the proposed grid/system upgrade or enhancement, the mechanism or modality for calculating payment streams, including the basis upon which performance will be measured and payment streams calculated/distributed, the expectations and liabilities of each party, the contract term, and the like. Ancillary contract terms and the issues typically associated with negotiation thereof are well known to persons skilled in the art. Each contractual undertaking is typically subject to regulatory approval(s).

Revenue Allocation Process

As noted above, the revenues to be paid to the independent entity may be calculated according to numerous differing models, e.g., depending on the project's stakeholders, the transmission operator and the type of project. Some transmission owners charge a given amount for each unit of energy that travels on their system while others get annual contracts to keep the lines operating independent of the amount of energy that flows.

1. Physical Rights (Transmission Service) Model

Under the "physical rights model," the transmission operator is paid for each unit of energy that moves through its system. In some cases, the charges include a component charge for distance traveled and in other cases it is point to point only. In addition, there is often a congestion charge component. The revenue model for the independent entity according to a physical capacity market is generally limited to the amount of incremental transmission service costs collected by the transmission owner as a direct result of the transmission system upgrade/enhancement effectuated by the independent entity according to the present disclosure.

Once the independent entity completes the transmission upgrade/enhancement, ownership of the associated equipment is typically transferred to the transmission owner for the specific use of selling "point-to-point" transmission services to its customers. Point-to-point service is generally used by generating, marketing and trading companies to sell their product to a specific location from a specific source. The transmission service costs for this type of transmission service are mandated by the transmission company's electrical service tariff filed and approved by FERC.

Generally, the revenue share for the independent entity according to the present disclosure is determined by calculating the amount of transmission service sold by the transmission owner over and above that which would have been available for sale without completion of the upgrade/enhancement project, i.e., the "incremental service costs." For every hour of every day, a percentage of the cost of service sold above the old flowgate capacity value is allocated for distribution to the independent entity by (i) monitoring/measuring such improved performance, (ii) transferring such measurement data to a processing unit programmed to calculate the agreed-upon percentage for payment to the independent entity, and (iii) making the appropriate calculations. On a periodic basis, e.g., each month, the applicable revenue share is distributed to the independent entity from the transmission owner until completion of the contract term, achievement of an agreed upon milestone, or other external event.

Thus, with reference to FIG. 1, an exemplary implementation of the physical rights model of the present disclosure is schematically depicted. According to the disclosed system 100, an independent entity 102 practices the system/method of the present disclosure by identifying an upgrade project 104, i.e., a project that is effective in improving the transmission capabilities/capacity of transmission owner 106 on the electric grid. The upgrade project 104 is typically identified by reviewing the feasibility and economic benefits of potential transmission upgrade/enhancement projects and selecting therefrom an upgrade project 104 that provides independent entity 102 with a feasible project with an acceptable return (based on incremental transmission service charges to be received by transmission owner(s) 106) to warrant an investment in the upgrade project 104. The upgrade project 104 may take a variety of forms, as will be apparent to persons skilled in the art, and may entail multiple discrete projects or undertakings which may be collectively referred to as upgrade project 104.

After selecting upgrade project 104, the independent entity 102 enters into an agreement with transmission owner(s) 106 whereby the independent entity 102 will receive an agreed-upon percentage or portion of the incremental transmission service revenue received by transmission owner(s) 106 (i.e., a "revenue share") as a result of its use of the completed/implemented upgrade project 104. The independent entity 102 then undertakes to develop, construct and make the capital investment required to effectuate upgrade project 104, while also assuming the risk/exposure associated with such undertaking. At completion of upgrade project 104, ownership thereof is transferred to transmission owner(s) 106.

As transmission service customers 108 utilize that portion of the grid maintained and operated by transmission owner(s) 106, the existence of upgrade project 104 (upon completion) enhances the performance and/or capacity thereof. Incremental transmission service revenues (i.e., revenues in excess of those collected before the upgrade was performed) are thus collected by transmission owner(s) 106 from transmission service customers 108. Measuring systems are operated in conjunction with the use of upgrade project 104, and based on the incremental transmission service costs generated as a result of upgrade project 104, a revenue share is calculated for payment to independent entity 102.

For purposes of calculating a revenue share in connection with the exemplary physical rights model disclosed herein, the calculation process generally uses appropriate load flow computer program model(s) that represents the time frames of interest, transmission and distribution territory location(s), transmission tariff requirements and pre-existing transmission service, generation, and load service commitments. The Transmission Distribution Factors (TDF) for all possible Point of Receipt (POR) to Point of Delivery (POD) combinations are generally determined for the transmission element(s) to be upgraded, i.e., the upgrade project(s) associated with the physical rights model calculation. These TDFs (typically represented in percent of total transmission service flow) are used to determine or model the impact of all transmission service requests that could occur as a direct result of the upgrade project during the period of interest, i.e., the period in which the revenue stream is subject to apportionment with respect to the independent entity that funded the upgrade project(s).

During the time periods for which revenue stream distribution/apportionment calculations are to be made, all applicable transmission service reservations that are "confirmed" (i.e., transmission service is granted and applicable cost charges are collected by the transmission owner or operator) are used to calculate the actual transmission service apportionment that was allocated to "flow" as a direct result of the upgrade project. For predetermined time periods, e.g., each hour, these values are added together to produce a sum that is compared to the pre-existing transmission element flow rating ("Pre-Upgrade Rating") and the new transmission element rating achieved as a result of the upgrade project ("Post-Upgrade Rating"). The costs of all transmission service that represent the amounts between the Pre-Upgrade Rating and Post-Upgrade Rating for each such time period (e.g., hour) are identified for treatment/inclusion in the revenue stream calculation ("Hourly Revenue Stream"). All Hourly Revenue Stream values are then added for the time period which is identified for payment to the independent entity (e.g. monthly) and such amounts are distributed as the "revenue stream."

Although the foregoing calculation modality represents an exemplary approach for measuring and calculating the enhanced performance of the utility grid based on incorporation of an upgrade project pursuant to the physical rights model, alternative measurement/calculation regimens may be utilized, as will be apparent to persons skilled in the art. The foregoing measurement, calculation and payment system is therefore merely illustrative of systems that may be employed according to the present disclosure.

2. Nodal (Load Service) Model

The revenue model for a nodal market is generally dependent on the potential nodal price decreases at given points or nodes on the transmission grid as a result of the upgrade project. If the price at a given node is reduced, this results in energy cost savings achieved by an electrical load serving company as a direct result of the transmission system upgrade/enhancement affected by the independent entity according to the present disclosure. Load serving companies conducting business in a nodal market are generally subject to electricity charges based on three cost components: (i) energy production, (ii) transmission service, and (iii) transmission congestion. Energy production costs represent the manufacturing of electricity from applicable generators (e.g., natural gas, coal, nuclear, etc.). Transmission congestion charges are incurred when transmission capacity between the generation sources and the load service company's delivery points are constrained. If transmission capacity is limited, the price of congestion increases, resulting in higher nodal prices at given points in the grid. This results in higher costs being paid by load serving entities for their required electricity needs at nodes which experience higher levels of congestion.

According to the present disclosure, a revenue share for the independent entity is determined by calculating the nodal prices as if the upgrade/enhancement had not been performed. Comparisons of nodal energy prices with and without the transmission upgrade/enhancement are performed on a periodic basis, e.g., for every hour (as measured at the applicable load delivery points). Based on the calculations of the processing unit, an agreed upon percentage of the differential between the congestion cost savings as measured by the differential between the actual and calculated nodal price is distributed to the independent entity by the regional transmission organization or independent system operator, as applicable, on a periodic basis pursuant to and until completion of the contract term.

Figure 2:
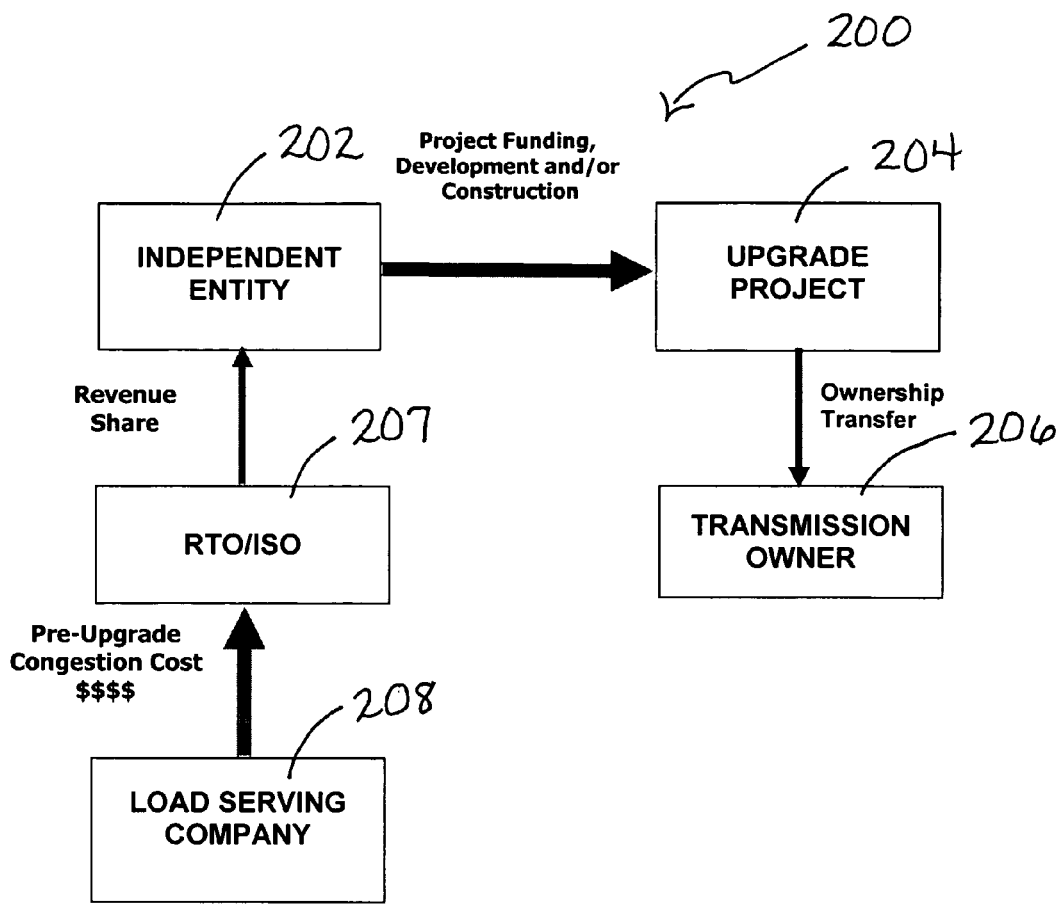
FIG. 2 is a schematic flow chart of an alternative implementation of the disclosed system/method for effecting utility grid upgrade(s) according to the present disclosure.

With reference to FIG. 2, an exemplary implementation of the nodal market or load service model is schematically depicted. According to the disclosed system 200, an independent entity 202 practices the system/method of the present disclosure by identifying an upgrade project 204, i.e., a project that is effective in improving the transmission capabilities/capacity of transmission owner(s) 206 on the electric grid. As with the previously described exemplary system of FIG. 1, the upgrade project 204 is typically identified by reviewing the feasibility and economic benefits of potential transmission upgrade/enhancement projects and selecting therefrom an upgrade project 204 that provides independent entity 202 with a feasible project with an acceptable return to warrant an investment in the upgrade project 204. However, in the case of the nodal model schematically depicted in FIG. 2, the potential investment return associated with upgrade project 204 is assessed in view of potential energy cost savings to be realized by a load serving company based upon implementation of upgrade project 204. The upgrade project 204 may take a variety of forms, as will be apparent to persons skilled in the art.

After selecting upgrade project 204, the independent entity 202 enters into an agreement with transmission owner and/or RTO/ISO 207. According to the nodal model schematically depicted in FIG. 2, the independent entity 202 agrees to undertake upgrade project 204 in return for receipt of an agreed-upon percentage or portion of the potential electricity cost savings calculated as a result of the reduced nodal price (i.e., "revenue share"). The genesis of such electricity cost savings are discussed herein above. The independent entity 202 then undertakes to develop, construct and make the capital investment required to effectuate upgrade project 204, while also assuming the risk/exposure associated therewith. At completion of upgrade project 204, ownership of the upgrade project 204 is transferred to transmission owner 206.

As load serving customers 208 utilize that portion of the grid operated by RTO/ISO 207, the existence of upgrade project 204 (upon completion) enhances the performance and/or capacity thereof, thereby reducing congestion. Thereafter, for a pre-determined contracted period of time, the RTO/ISP 207 calculates a tracking nodal price based on the nodal price that would have existed if the upgrade project 204 had not been performed. The difference between the tracking nodal price and the actual nodal price corresponds to the congestion cost savings. For a pre-negotiated contracted period of time, only a portion of the reduced nodal price is passed on to load serving customers 208 by RTO/ISO 207 with the remaining differential in nodal pricing being subject to a revenue share paid to independent entity 202.

For purposes of calculating the revenue share, measuring systems are operated in conjunction with the use of upgrade project 204, and based on electricity cost savings generated as a result of upgrade project 204, a revenue share is calculated for payment to independent entity 202. Through collection of the revenue share from RTO/ISO 207, the independent entity 202 stands to recover its investment costs with respect to upgrade project 204 and realize a profit thereon.

For purposes of calculating a revenue share in connection with the exemplary nodal model disclosed herein, the calculation process generally uses applicable congestion cost determination computer models that represent the relevant time frames, transmission and distribution territory location, transmission tariff requirements and pre-existing transmission service, generation, and load service commitments, and all designated electrical energy delivery points (i.e., nodes) that are affected by the upgrade project. Transmission element(s) to be upgraded are typically identified in proportion of percentage of total affect. These nodes are collectively known as the "affected nodes."

During times relevant for revenue stream calculation/distribution, the total cost of transmission system restriction associated with allowing the most economic and/or requested energy flow to the Affected Nodes (i.e., congestion) is measured and recorded. For these time periods, a calculation may be advantageously performed to determine the portion of congestion that was not offset by applicable market functions (e.g., financial transmission rights ("FTRs"), economic generation dispatch, non-load-serving transfer path flow) to determine the amount of congestion cost that could be hedged by relevant market participants ("Post-Upgrade Unhedgeable Congestion Cost").

A separate calculation is typically performed to determine the amount of Unhedgeable Congestion cost that would have occurred during the same time period if the transmission element(s) were not upgraded ("Pre-Upgrade Unhedgeable Congestion Cost"). The load paying customers that receive electrical energy from the Affected Nodes, via a total energy bill from the appropriate energy providers, pay the appropriate portions of Pre-Upgrade Unhedgeable Congestion Cost. The difference between Pre-Upgrade Unhedgeable Congestion Cost and the Post-Upgrade Unhedgeable Congestion Cost are determined for predetermined periods, e.g., each hour. These values are added together for the time period which is relevant for payment to the independent entity (e.g. monthly) and distributed as the revenue stream.

Although the foregoing calculation modality represents an exemplary approach for measuring and calculating the enhanced performance of the utility grid based on incorporation of an upgrade project pursuant to the nodal model, alternative measurement/calculation regimens may be utilized, as will be apparent to persons skilled in the art. The foregoing measurement, calculation and payment system is therefore merely illustrative of systems that may be employed according to the present disclosure.

Discrete Benefit Model

An exemplary revenue model for discrete benefits is dependent on the increased revenue share achieved by a merchant generator, energy trading or other applicable company as a direct result of the transmission system upgrade/enhancement performed by the independent entity according to the present disclosure. Companies that have business models dependent on the sale of merchant energy for profit (e.g., merchant generators, energy traders) require the ability to have their product delivered to their customer. Many of these businesses are facing the reality that severe limitations of the U.S. electrical transmission system (whether physical, commercial or regulatory) are preventing them from accessing their desired customer base. Opportunities exist for the system and method of the present disclosure to be employed with these types of companies for mutual benefit.

According to exemplary embodiments of the present disclosure, the revenue share to be paid the independent entity in consideration of its upgrade/enhancement to the grid/system is determined by calculating the incremental electricity sale revenues achieved by the merchant company that could not have been accomplished without the transmission upgrade/enhancement project. A contracted percentage of forward sales or a "one-time" payment amount of future revenue is collected by the independent entity from the merchant company, e.g., for the term of the contract or payable upon completion of the project.

Figure 3:
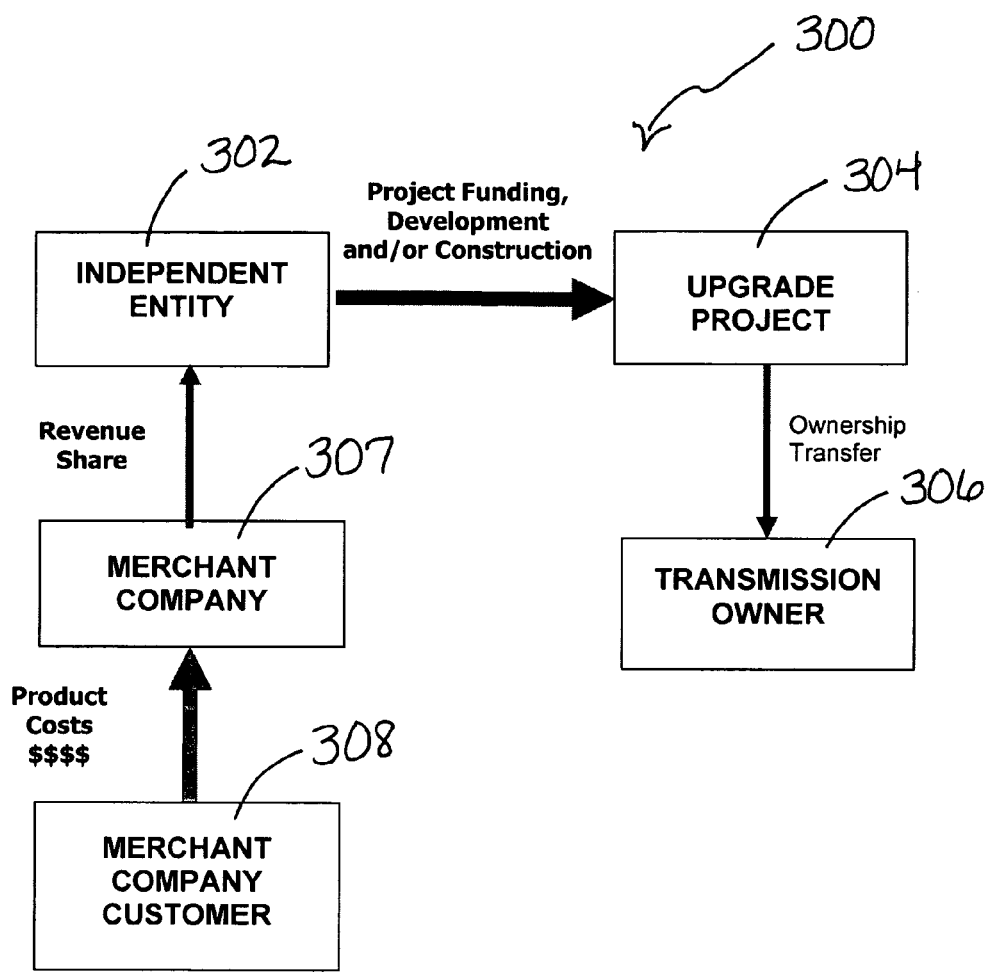
FIG. 3 is a schematic flow chart of a further alternative implementation of the disclosed system/method for effecting utility grid upgrade(s) according to the present disclosure.

With reference to FIG. 3, an exemplary implementation of the discrete benefit model is schematically depicted. According to the disclosed system 300, an independent entity 302 practices the system/method of the present disclosure by identifying an upgrade project 304, i.e., a project that is effective in improving the transmission capabilities/capacity of transmission owner(s) 306 on the electric grid. As with the previously described exemplary systems of FIGS. 1 and 2, the upgrade project 304 is typically identified by reviewing potential transmission upgrade/enhancement projects and selecting therefrom an upgrade project 304 that provides independent entity 302 with an acceptable return so as to warrant an investment in the upgrade project 304. In the case of the discrete benefit model schematically depicted in FIG. 3, the potential investment return associated with upgrade project 304 is assessed in view of the increased revenue achieved by a merchant generator, energy trading or other applicable company based upon implementation of upgrade project 304. The upgrade project 304 may take a variety of forms, as will be apparent to persons skilled in the art.

After selecting upgrade project 304, the independent entity 302 enters into an agreement with merchant company 307 whereby the independent entity 302 will receive an agreed-upon percentage or portion of the incremental electricity sales revenues achieved by merchant company 307 (i.e., a "revenue share") as a result of its use of the completed/implemented upgrade project 304. The independent entity 302 makes the capital investment required to effectuate upgrade project 304, while also assuming the risk/exposure associated with such undertaking. At completion of upgrade project 304, ownership thereof is transferred to transmission owner(s) 306.

As transmission service customers 308 utilize that portion of the grid maintained and operated by transmission owner(s) 306, the existence of upgrade project 304 (upon completion) enhances the performance and/or capacity thereof. Incremental electricity sales revenues are thus realized by merchant company 307 from merchant company customers 308. Measuring systems are operated in conjunction with the use of upgrade project 304, and based on the incremental electricity sales revenues generated as a result of upgrade project 304, a revenue share is calculated for payment to independent entity 302. Through collection of the revenue share from merchant company 307, the independent entity 302 stands to recover its investment costs with respect to upgrade project 304 and realize a profit thereon.

For purposes of calculating a revenue share in connection with the exemplary discrete benefit model disclosed herein, the calculation process generally uses applicable electrical energy product cost benefit determination computer models that represent the relevant time frames, transmission territory location, transmission tariff requirements and pre-existing transmission service, generation, and load service commitments. Appropriate delivery location or locations are generally identified (e.g., control area interfaces, load delivery zones, generation interconnection points) and such location(s) are typically used to measure actual performance of an upgrade project, e.g., an upgraded transmission element.

For a predetermined period, e.g., each hour, actual energy product delivery is measured per defined parameters developed by applicable parties. The appropriate cost of services that is charged the customer or customers of these products is developed for this time period ("Post-Upgrade Discrete Benefit Cost"). A separate calculation is performed for the same time periods which represent the expected delivery of energy products, i.e., as if the transmission element upgrade or upgrades were not performed. The respective cost of products is developed for the calculated expected amount of services ("Pre-Upgrade Discrete Benefit Cost"). The difference between the Pre-Upgrade Discrete Benefit Cost and the Post-Upgrade Discrete Benefit Cost are determined for the predetermined periods, e.g., each hour. These values are added for an overall time period and such sum is identified for payment to the independent entity and distributed as the revenue stream.

Although the foregoing calculation modality represents an exemplary approach for measuring and calculating the enhanced performance of the utility grid based on incorporation of an upgrade project pursuant to the discrete benefit model, alternative measurement/calculation regimens may be utilized, as will be apparent to persons skilled in the art. The foregoing measurement, calculation and payment system is therefore merely illustrative of systems that may be employed according to the present disclosure.

Although the systems and methods of the present disclosure have been described with reference to exemplary embodiments, the present disclosure is not intended to be limited by such illustrative embodiments. Rather, numerous improvements, enhancements, modifications and/or variations may be made with respect to the disclosed embodiments without departing from the spirit or scope of the present invention. Thus, the present invention expressly encompasses such improvements, enhancements, modifications and/or variations, as will be readily apparent to those of ordinary skill in the art from the detailed description provided herewith.

The invention claimed is:

1. A method for improving performance of a utility grid that is used by entities that provide generation, transmission and distribution services, said method comprising:
   a. establishing an entity that is independent from the entities that provide generation, transmission and distribution services in connection with said utility grid;
   b. identifying at least one upgrade project associated with the utility grid that satisfies at least one of the following criteria: (i) incrementally increases the revenues of at least one of the entities that provide generation, transmission and distribution services with respect to the utility grid, or (ii) incrementally reduces the costs of at least one of the entities that provide generation, transmission and distribution services with respect to the utility grid or an electricity user, wherein said upgrade project includes at least one physical installation associated with said utility grid that directly reduces a transmission bottleneck or other cause of congestion on said utility grid;
   c. funding the implementation of said at least one upgrade project using funds of said independent entity;
   d. measuring performance of the utility grid with respect to at least one predetermined performance parameter representing at least one physical attribute of the utility grid so as to determine the difference in performance of the utility grid with respect to said at least one performance parameter based on incorporation of the upgrade project;
   e. calculating a revenue share based on economic benefits realized by at least one of the entities that provide generation, transmission or distribution with respect to the utility grid based on said performance measurement relative to a base performance level in the absence of said upgrade project, said revenue share calculation being performed by a processing unit that is programmed to perform said calculation based at least in part on said performance measurement relative to said base performance level; and f. transferring monetary value equal to said calculated revenue share to said independent entity.

2. A method according to claim 1, wherein said at least one upgrade project is selected from the group consisting of: (i) adding at least one equipment unit to the utility grid in parallel with an existing equipment unit, (ii) upgrading at least one existing transmission component associated with the utility grid, (iii) installing at least one new transmission component to the utility grid, and (iv) a combination thereof.

3. A method according to claim 1, further comprising transferring ownership of the upgrade project from the independent entity to an entity that provides transmission services in connection with the utility grid.

4. A method according to claim 1, wherein said identification of said at least one upgrade project includes assessment of one or more factors selected from the group consisting of: (i) project cost, (ii) geographic location, (iii) entity providing transmission services in geographic location, (iv) estimated time to complete upgrade project, (v) estimated revenue share associated with said upgrade project, (vi) feasibility of calculating estimated revenue share for said upgrade project, (vii) regulatory requirements associated with implementation of said upgrade project, and (viii) combinations thereof.

5. The method according to claim 1, wherein said at least one upgrade project enhances the performance of the utility grade such that transmission service costs collected by an entity providing transmission services with respect to the utility grid are increased.

6. The method according to claim 5, wherein said revenue share is calculated based on a difference in transmission service costs collected by said transmission services entity after implementation of the at least one upgrade project as compared to a calculated number corresponding to transmission service costs that would have been collected by said transmission services entity before implementation of the at least one upgrade project.

7. The method according to claim 6, wherein said difference in transmission service costs is calculated in part based on said performance measurement with respect to said at least one predetermined performance parameter.

8. The method according to claim 6, wherein said revenue share is a percentage of said difference in transmission service costs.

9. The method according to claim 1, wherein said at least one upgrade project enhances the performance of the utility grade such that energy costs for an electrical load serving entity are decreased.

10. The method according to claim 9, wherein said revenue share is calculated based on a difference in a calculated number that corresponds to energy costs that would have been incurred by said electrical load serving entity had implementation of the at least one upgrade project not taken place, as compared to a calculated number that corresponds to energy costs that would have been incurred by said electrical load serving entity after implementation of the at least one upgrade project.

11. The method according to claim 10, wherein said difference in energy costs is calculated in part based on said performance measurement with respect to said at least one predetermined performance parameter.

12. The method according to claim 11, wherein said revenue share is a percentage of said difference in energy costs.

13. The method according to claim 11, wherein said at least one predetermined performance parameters include: (i) energy production costs incurred by said electrical load serving company, (ii) transmission service incurred by said electrical load serving company, and (iii) transmission congestion charges incurred by said electrical load serving company.

14. The method according to claim 1, wherein said at least one upgrade project enhances the performance of the utility grade such that revenues for a merchant generator, energy trading company or other entity involved in the sale of merchant energy, are increased.

15. The method according to claim 14, wherein said revenue share is calculated based on a difference in revenues earned by said merchant generator, energy trading company or other entity involved in the sale of merchant energy after implementation of the at least one upgrade project as compared to revenues earned by said merchant generator, energy trading company or other entity involved in the sale of merchant energy before implementation of the at least one upgrade project.

16. The method according to claim 15, wherein said difference in revenues is calculated in part based on said performance measurement with respect to said at least one predetermined performance parameter.

17. The method according to claim 15, wherein said revenue share is a percentage of said difference in revenues.

* * * * *